(12) United States Patent
Mader

(10) Patent No.: US 7,334,677 B2
(45) Date of Patent: Feb. 26, 2008

(54) CONVEYOR CHAIN COMPRISING CHAIN LINKS CONNECTED TO ONE ANOTHER VIA PIVOTING BEARINGS, AND A METHOD FOR ASSEMBLING THE CHAIN LINKS

(75) Inventor: Carl Conrad Mader, Hittnau (CH)

(73) Assignee: Ferag AG, Hinwil (CH)

( * ) Notice: Subject to any disclaimer, the term of this patent is extended or adjusted under 35 U.S.C. 154(b) by 0 days.

(21) Appl. No.: 11/682,491

(22) Filed: Mar. 6, 2007

(65) Prior Publication Data

US 2007/0209911 A1 Sep. 13, 2007

(30) Foreign Application Priority Data

Mar. 8, 2006 (CH) .................................. 0367/06

(51) Int. Cl.
*B65G 17/38* (2006.01)
(52) U.S. Cl. ...................................... 198/850; 198/853
(58) Field of Classification Search ................ 198/850, 198/851, 852, 853
See application file for complete search history.

(56) References Cited

U.S. PATENT DOCUMENTS

| 3,278,000 | A | * | 10/1966 | Anson | 198/850 |
|---|---|---|---|---|---|
| 4,050,323 | A | * | 9/1977 | l'Anson | 198/853 |
| 4,294,345 | A | | 10/1981 | Stauber et al. | |
| 4,766,997 | A | * | 8/1988 | Hannum | 198/853 |
| 6,321,523 | B1 | * | 11/2001 | Christmas | 198/851 |
| 6,782,687 | B1 | * | 8/2004 | Mingers | 198/850 |
| 6,978,886 | B2 | * | 12/2005 | Karnes | 198/852 |
| 7,063,207 | B2 | * | 6/2006 | Sykora | 198/853 |

FOREIGN PATENT DOCUMENTS

| GB | 588483 | 5/1947 |
|---|---|---|
| GB | 906751 | 9/1961 |

* cited by examiner

*Primary Examiner*—James R. Bidwell
(74) *Attorney, Agent, or Firm*—Rankin, Hill, Porter & Clark LLP

(57) ABSTRACT

In a conveyor chain, which includes chain links (1) being connected to one another via pivoting bearings (4), each chain link (1) has two link plates (2 and 3) and a bolt (5) which connects the two bolt ends (2.2 and 3.2) of the link plates (2 and 3) and is articulately mounted in the bearing ends (2.1 and 3.1) of the link plates (2 and 3) of an adjacent chain link. The bearing housing of the pivoting bearing (4) comprises two bearing housing parts (8 and 9), and each bearing housing part (8 and 9) comprises a part flange (17). The part flange (17) of the bearing housing parts (8 and 9), and the bearing ends (2.1 and 3.1) of the link plates (2 and 3) are held together with the help of a common fixation means, in a manner such that, alone by way of this fixation means, the bearing housing parts (8 and 9) firmly enclose the bearing body (6) and are fastened in the bearing ends (2.1 and 3.1) of the link plates (2 and 3), secured against rotation and axial displacement, and the bearing ends (2.1 and 3.1) of the link plates (2 and 3) are fixed relative to one another.

13 Claims, 2 Drawing Sheets

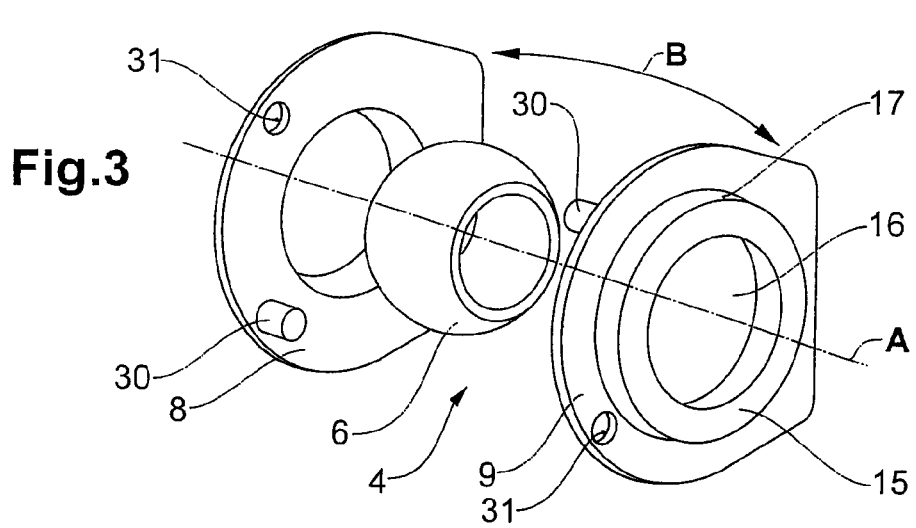
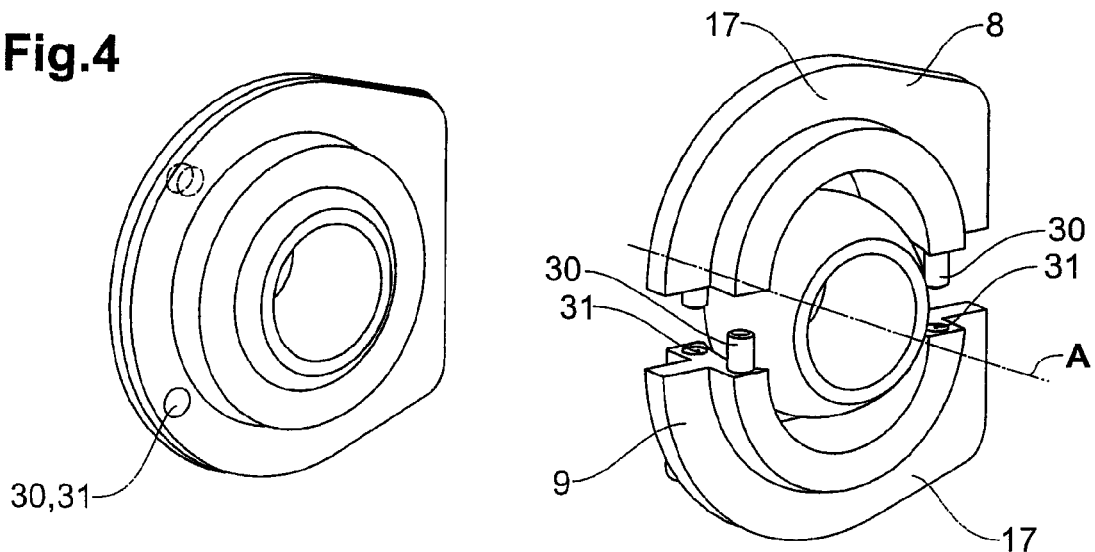
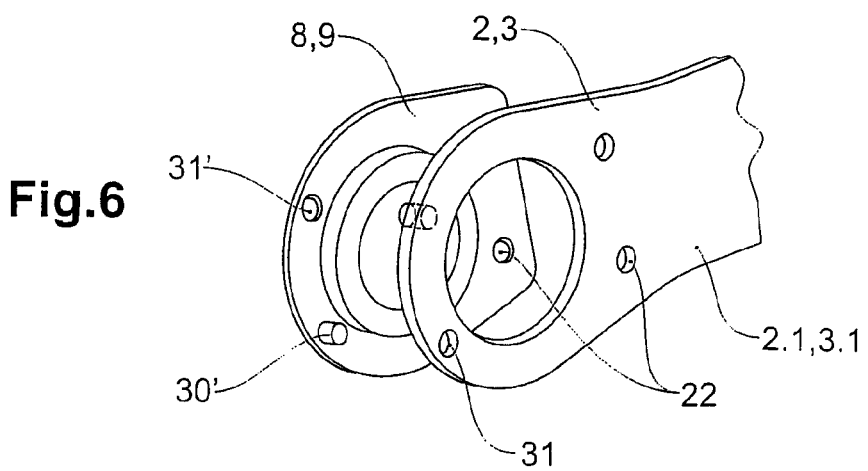

CONVEYOR CHAIN COMPRISING CHAIN LINKS CONNECTED TO ONE ANOTHER VIA PIVOTING BEARINGS, AND A METHOD FOR ASSEMBLING THE CHAIN LINKS

BACKGROUND OF THE INVENTION

1. Field of the Invention

The invention lies in the field of conveyor technology, and relates to a conveyor chain, which includes a plurality of chain links being connected to one another via pivoting bearings. The conveyor chain is particularly suitable for conveying individually held printed products, and for this purpose may include grippers, wherein for example one gripper is arranged on each chain link. The invention further relates to a method for the assembly of the chain links of the conveyor chain.

2. Description of Related Art

Conveyor paths with curves and twists in all directions can be realized with conveyor chains including chain links which are connected to one another via pivoting bearings or universal joints. Due to the pivoting bearings, adjacent chain links are pivotable in a limited manner relative to one another in all directions transverse to the chain length. The chains are usually guided in so-called chain channels, and the chain links include runner rollers on which they roll, on rails provided in the channels.

Each chain link of such a chain usually comprises two link plates which extend essentially in the chain longitudinal direction. The two link plates are connected to one another via a bolt at their one end (bolt end). A middle region of the bolt is mounted between the bolt ends of the link plates in a pivoting bearing being arranged at the other end (bearing end) of the link plates of an adjacent chain link. The two link plates of each chain link are, thus, connected to one another at their bolt ends via the bolt, and the pivoting bearing is arranged in the region of their bearing ends, wherein the bolt of each chain link is connected to the link plates of an adjacent link by being mounted in an articulated manner to the bearing ends of the link plates of this adjacent chain link.

Usually, a runner roller is arranged on both ends of the bolt of each chain link on the outer side of the link plates. A carrier body may be arranged between the bolt ends and the bearing ends of the link plates of each chain link, on which carrier body, for example, a gripper is mounted. The carrier body may additionally carry a third runner roller, whose axis is aligned perpendicularly to the bolt or to the axes of the other two runner rollers respectively.

Usually, a commercially available bearing bush is used as a pivoting bearing, and this bearing bush including a bearing housing forming a bearing cup, and a ball-like bearing body which is captured in the bearing cup and is freely rotatable therein. The bearing body has a cylindrical opening for receiving the bolt. The bearing housing is usually cylindrical and the bearing cup comprises two openings lying opposite one another, for the passage of the bolt. Usually, the bearing manufacturer produces the bearing housing as one piece, wherein the bearing cup is coated and closed around the bearing body. The bearing housing and the bearing body together form the bearing bush. For assembling the chain links, the bearing housing of the bush is connected to the bearing ends of the link plates of a chain link, and the bearing body of the bush is connected to the bolt of an adjacent chain link. Usually, an opening is provided at the bearing ends of the link plates for mounting the bearing housing, wherein these openings are matched to the outer diameter of the bearing housing. The two link plates are then fastened to one another, in a manner such that their bearing ends bear on one another, and that the two openings provided for the bearing housing are aligned to one another. The bearing bush is then positioned in the openings, and a connection between the bearing housing and the link plates is effected through calking, in a manner such that the bearing housing can neither be rotated nor moved in the axial direction relative to the link plates.

BRIEF SUMMARY OF THE INVENTION

It is the object of the invention to create a conveyor chain from chain links connected to one another via pivoting bearings, wherein the assembly of the chain links is to be more flexible and simpler for the conveyor chain according to the invention, compared to the corresponding assembly for known such conveyor chains.

The conveyor chain according to the invention differs from the known conveyor chains, including chain links connected to one another via pivoting bearings as described further above, in that the pivoting bearings of the chain links comprise a two-part bearing housing with flanges, wherein the flanges extend outwards from the bearing cup in a middle plane perpendicular to the bearing housing axis. Furthermore, the chain links include a fixation means, which engages on the flanges and on the bearing ends of the link plates, and which firstly holds together the bearing housing parts to form a bearing cup filmy enclosing the bearing body, which secondly fixes the bearing ends of the link plates relative to one another, and which thirdly fixes the bearing housing on these bearing ends to be secured against rotation and axial displacement. The fixation means, which is able to assume all these functions, consists for example of a plurality of bores through the flange of the bearing housing parts and the bearing ends of the link plates, and rivets arranged in the bores.

The shape of the flanges of the bearing housing advantageously corresponds to the shape of the bearing ends of the link plates, in a manner such that the bearing housing parts and the link plates, and, as the case may be, bores (part of the fixation means) previously produced therein, can, for the assembly, be aligned to one another in a simple manner and in particular using one and the same aligning device.

The two bearing housing parts are advantageously identical. If together they form a bearing housing with a parting plane which is a middle plane aligned transversely to the housing axis, each of the bearing housing parts includes a part flange, wherein the two part flanges bear on one another in the assembled condition. Such a pivoting bearing is mounted at the bearing ends of the link plates, for example, in the following manner: the bearing end of the first link plate is positioned by way of the aligning device; the first bearing housing part with the bearing cup facing upwards is then positioned with the aid of the same aligning device on the already positioned bearing end and aligned with the latter; the bearing body is positioned in the bearing cup of the first bearing housing part; the second bearing housing part is positioned and aligned with the bearing cup facing downwards; the bearing end of the second link plate is positioned and aligned; and then the fixation means are mounted.

In order to further simplify the assembly of the pivoting bearings on the link plates of the chain links of the conveyor chain according to the invention, as briefly described above, the bearing housing parts may include fastening means, with which they can be closed around the bearing body very simply and in a provisional manner only, that is to say without the strength necessary for operation, and possibly in a releasable manner. Such pre-assembled bearing bushes may then, for example, be taken on stock, to be positioned and aligned to the bearing ends of the link plates for the assembly, as one part (instead of three parts as described above). The pre-assembled bearing bushes may also include two bearing housing parts separated in a radial plane.

Likewise, for the further simplification of the assembly of the pivoting bearing at the bearing ends of the link plates, the bearing housing parts and the bearing ends of the link plates may include fastening means, with which in each case a bearing housing part can be provisionally mounted at a bearing end of a link plate. In this case, two preassembled units in each case of a link plate with a bearing housing part provisionally mounted thereon, may for example be taken from the stock, and positioned and aligned to one another as units, before they are definitively fixed to one another.

In particular, pins and matching bores designed for an easy press fit or a snap-fit are suitable as fastening means for the provisional assembly of bearing housing parts to one another, or of bearing housing parts to link plates. Adhesive connections may also be used. For the provisional fastening of bearing housing parts on link plates, the bearing housing parts may also be designed in a manner such that they can be snapped into the openings of the bearing ends of the link plates.

Evidently, the assembly of the chain links is very simple and is flexible regarding the material pairing of bearing body and bearing housing. This material pairing can be freely selected during design and assembly, i.e. can be adapted to a potential loading of a chain, which is hardly possible to such a degree for ready made bearing bushes obtainable from a manufacturer. The bearing bodies and the bearing housing parts may consist of a metallic material or of plastic, and the material pairing and, as the case may be, a coating of the bearing cup may be selected depending on the task and loading of the chain links.

The conveyor chain according to the invention, as already previously mentioned, is suitable in particular for conveying individually held printed products, such as newspapers, magazines and brochures, wherein, for example, each chain link carries a gripper for gripping a printed product. Of course, a same conveyor chain may also be designed for other conveying tasks, wherein not necessarily grippers, but other holding or carrying means may be mounted on the chain links, and wherein not every chain link needs to carry such a means.

BRIEF DESCRIPTION OF THE DRAWINGS

Preferred embodiments of the conveyor chain according to the invention, which chain comprises chain links connected to one another via pivoting bearings, are described in detail in connection with the following Figs., wherein:

FIG. 2: partly exploded);

FIG. 3 shows the parts of the pivoting bearing of the chain link according to FIGS. 1 and 2;

FIG. 4 shows a pre-assembled bearing bush for the chain link according to FIG. 1;

FIG. 5 shows the parts of another embodiment of the bearing bush able to be pre-assembled;

FIG. 6 shows a bearing housing part and a bearing end of a link plate with fastening means for provisional fastening.

DETAILED DESCRIPTION OF THE INVENTION

Figure 1:
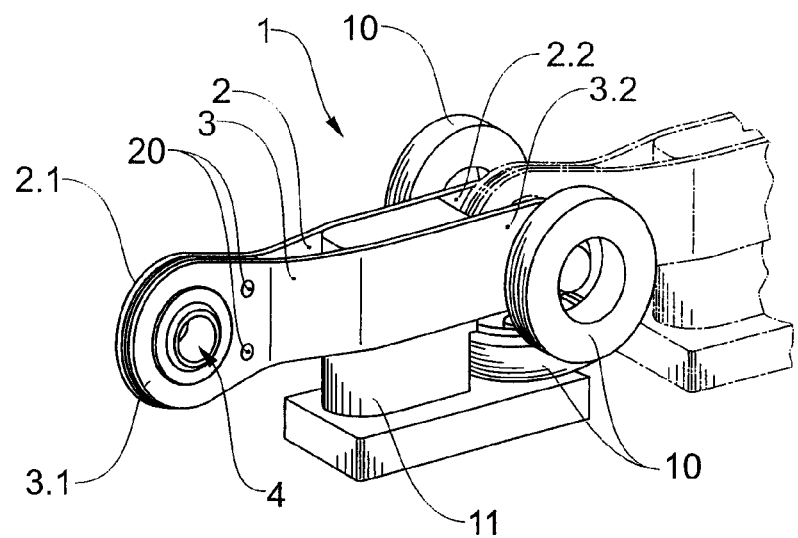
FIGS. 1 and 2 show a chain link of a preferred embodiment of the conveyor chain according to the invention (FIG. 1: assembled.
Figure 2:
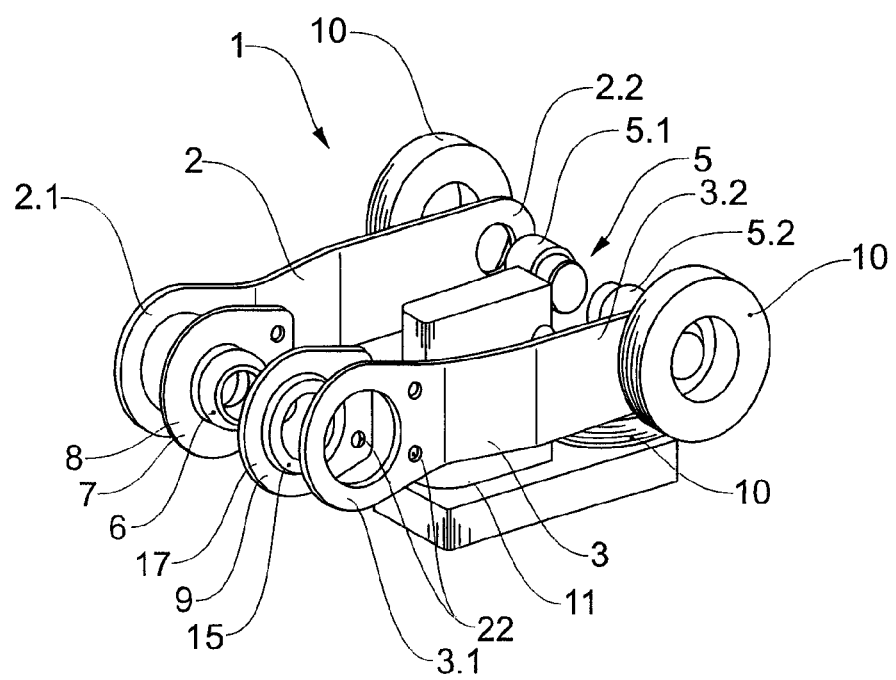

FIGS. 1 and 2 show a chain link 1 of a preferred embodiment of the conveyor chain according to the invention. FIG. 1 shows the chain link 1 in the assembled condition, FIG. 2 partly exploded. As shortly described further above, the chain link 1 comprises two link plates 2 and 3, carrying in the region of their mutually aligned bearing ends 2.1, 3.1 a pivoting bearing 4, and at their bolt ends 2.2 and 3.2, being connected to one another via a bolt 5 or via corresponding bolt stubs 5.1 and 5.2 fastened in the bearing body of the next chain link. The pivoting bearing 4 comprises a ball-like bearing body 6 with a through opening for receiving and fastening the bolt 5 of the adjacent chain link, as well as two bearing housing parts 8 and 9.

The chain link 1 further comprises three runner rollers 10 and a carrier body 11, on which for example a gripper (not shown) is mounted.

FIG. 3, in an enlarged scale, shows the parts of the pivoting bearing 4 of the chain link according to FIGS. 1 and 2. The two bearing housing parts 8 and 9 form a bearing cup for the bearing body 6, wherein the parting plane between the two bearing housing parts 8 and 9 is a middle plane aligned transversely to the housing axis A. Both bearing housing parts 8 and 9 comprise a bearing cup region 15 with a through opening 16, and a part flange 17 extending to the outside on the parting plane of the bearing cup region 15. The part flanges of the two bearing housing parts 8 and 9 bear on one another in the assembled condition, wherein the two part flanges 17 in each case make up half the thickness of the total flange. Therein, it is not necessary for the flange to extend around the complete bearing cup in an uninterrupted manner. A plurality of suitably arranged flange sectors separated from one another is also conceivable.

As is particularly evident from FIG. 2, the bearing ends 2.1 and 3.1 of the link plates 2 and 3 comprise openings, which are matched to the bearing cup regions 15 of the bearing housing parts 8 and 9. Furthermore, the part flanges 17 of the bearing housing parts 8 and 9 are matched to the bearing ends 2.1 and 3.1 with regard to shape, in a manner such that they can be aligned to one another using the same aligning device as for aligning the bearing ends of the link plates. In the represented case, the flanges are equally as large as the bearing ends of the link plates, and have an equal, essentially round shape. A suitable alignment device, for example, comprises a base plate and a plurality of aligning rods which stand perpendicular on the base plate and which are arranged in a line corresponding to the outline of the part flange 17 and the bearing ends 2.1 and 3.1 of the link plates 2 and 3.

As fixation means, bores 22 (FIG. 2) are drilled, for example, through the bearing ends 2.1 and 3.1 of the link plates 2 and 3, which are aligned to one another, and through the part flanges 17 of the bearing housing parts 7 and 8 arranged therebetween, and rivets 20 (FIG. 1) are arranged therein. If the bearing ends 2.1 and 3.1 of the link plates are biased towards one another, it is sufficient to incorporate two rivetings on the side of the bearing housing parts 7 and 8 facing towards the bolt end 2.2 and 3.2, as is represented in FIG. 1. Therewith, it is possible to design the part flanges 17 and the bearing ends 2.1 and 3.1 of the link plates 2 and 3 with a small radial extension, which is advantageous for many applications. It is however also possible to distribute corresponding bores and rivets all around the bearing cup. By way of the riveting, on the one hand the bearing housing parts 8 and 9 are securely connected to one another to securely enclose the bearing body 6, and on the other hand the bearing bush consisting of the bearing housing parts 8 and 9 and the bearing body 6 is fixed, secured against rotations and against axial displacement, at the bearing ends 2.1 and 3.1 of the link plates 2 and 3, wherein these bearing ends 2.1 and 3.1 are also fixed relative to one another.

Of course, it is also possible to incorporate the bores 22 for the riveting of the part flanges 17 of the bearing housing parts 8 and 9 and of the bearing ends 2.1 and 3.1 of the link plates 2 and 3 separately in all parts, and then to merely align the parts and rivet them together. This is indicated in FIG. 2 by the bores 22.

Fixation means other than riveting are also conceivable, for example screws or clamps being arranged in aligned grooves in the narrow sides of the link plates 2 and 3 and the part flanges 17 of the bearing housing parts 8 and 9.

As shown in FIG. 3, it is also possible to provide the bearing housing parts 8 and 9 with matching fastening means with whose help the two bearing housing parts 8 and 9 are closed around the bearing body 6 in a provisional manner, i.e. without the strength necessary for operation, and preferably releasable. Such pre-assembled bearing bushes can be stocked and mounted to a chain link as a unit. In the represented case, the fastening means are pins 30 and bores 31 aligned to the pins, wherein the pins and bores are, for example, designed for a press fit or for a snap fit.

As indicated in FIG. 3 by double arrow B, the two bearing housing parts 8 and 9, provided with fastening means, may also be connected to one another in a hinged manner, in the case of plastic parts, for example by way of a film hinge.

FIG. 4 shows the bearing bush pre-assembled from the parts represented in FIG. 3.

FIG. 5 shows bearing housing parts 8 and 9 which can be pre-assembled and which form a bearing housing with a radial parting plane, wherein the bearing housing axis A lies in the parting plane. The fastening means are arranged in the region of this parting plane, and consist again of pins 30 and corresponding bores 31. Evidently, bearing housing parts, as represented in FIG. 5, are particularly suitable for a preassembly of the bearing bush. The flange of the bearing housing formed by the parts 8 and 9 is separated into two part flanges 17 by the parting plane, wherein each of the part flanges 17 forms 180° of the complete flange. In this case too, it is not necessary for the flange to extend fully around the bearing cup. Suitably arranged flange sectors separated from one another may also assume the flange function.

FIG. 6 shows the parts of a pre-assembled unit consisting of a bearing housing part 8 or 9 and of a link plate 2 or 3 (only bearing end 2.1 or 3.1 represented). Fastening means are provided for the preassembly, which here may consist of pins 30' and corresponding bores 31'. It is however also possible to design the bearing cup region of the bearing housing parts in a manner such that they can be snapped into the bearing ends of the link plates or fixed by a press fit, so that further fastening means are not necessary.

The invention claimed is:

1. A conveyor chain comprising a plurality of chain links (1) being connected to one another via pivoting bearings (4), each chain link (1) comprising:
   two link plates (2 and 3) extending essentially in the direction of a chain length and having a bearing end (2.1 and 3.1) and a bolt end (2.2 and 3.2),
   a bolt (5) connecting the two bolt ends (2.2 and 3.2) of the link plates (2 and 3) and
   a pivoting bearing arranged at the bearing ends (2.1 and 3.1) of the link plates (2 and 3),
   wherein the bolt (5) of each chain link (1) is mounted in the pivoting bearing of the adjacent chain link,
   wherein the pivoting bearing (4) comprises a ball-like bearing body (6) and a bearing housing, the bearing housing comprising two bearing housing parts (8 and 9) with a part flange (17) each, and
   wherein the part flanges (17) of the bearing housing parts (8 and 9), and the bearing ends (2.1 and 3.1) of the link plates (2 and 3) are fixed together with the help of a common fixation means, in a manner such that the bearing housing parts (8 and 9) firmly enclose the bearing body (6) and are fastened in the bearing ends (2.1 and 3.1) of the link plates (2 and 3), secured against rotation and axial displacement, and the bearing ends (2.1 and 3.1) of the link plates (2 and 3) are fixed relative to one another, by way of this fixation means only.

2. The conveyor chain according to claim 1, wherein a parting plane between the two bearing housing parts (8 and 9) is a middle plane aligned perpendicularly to a bearing housing axis (A).

3. The conveyor chain according to claim 1, wherein a parting plane between the two bearing housing parts (8 and 9) is a radial middle plane, in which a bearing housing axis (A) lies.

4. The conveyor chain according to claim 1, wherein the common fixation means is arranged on a side of the pivoting bearing (4) facing towards the bolt end (2.2 and 3.2) of the link plates (2 and 3), and wherein the bearing ends (2.1 and 3.1) of the link plates (2 and 3) are biased towards each other.

5. The conveyor chain according to claim 1, wherein the fixation means comprises bores (22) and rivets (20) arranged in the bores (22).

6. The conveyor chain according to claim 1, wherein the part flanges (17) of the bearing housing parts (8 and 9) have a shape which is adapted to the shape of the bearing ends (2.1 and 3.1) of the link plates (2 and 3), in a manner such that the bearing ends (2.1 and 3.1) of the link plates (2 and 3), and the bearing housing parts (8 and 9) are able to be aligned with one another using only one GE aligning device.

7. The conveyor chain according to claim 1, wherein the bearing housing parts (8 and 9) comprise fastening means for a provisional fastening to one another.

8. The conveyor chain according to claim 1, wherein the bearing housing parts (8 and 9) and the bearing ends (2.1 and 3.1) of the link plates (2 and 3) comprise fastening means for a provisional fastening in each case of one bearing housing part (8 or 9) in the bearing end (2.1 or 3.1) of one link plate (2 or 3).

9. The conveyor chain according to claim 7, wherein the fastening means comprises pins (30, 30') and bores (31, 31') adapted to the pins (30, 30').

10. A method for assembling a chain link (1) of a conveyor chain according to claim 1, the method comprising the steps of:
    positioning the bearing ends (2.1 and 3.1) of the link plates (2 and 3), and the bearing housing parts (8 and 9) in alignment with one another,
    introducing the bearing body (6) into the bearing cup formed by the bearing housing parts (8 and 9), and
    fixing the part flanges (17) of the bearing housing parts (8 and 9), and the bearing ends (2.1 and 3.1) of the link plates (2 and 3) relative to one another with the common fixation means.

11. The method according to claim 10, wherein the bearing housing parts (8 and 9) and the bearing body (6) are pre-assembled into a provisional bearing bush by way of fastening means arranged on the bearing housing parts, and wherein the provisional bearing bush is positioned in alignment with the bearing ends (2.1 and 3.1) of the link plates (2 and 3) to be then definitively fixed to the latter.

12. The method according to claim 10, wherein in each case one bearing housing part (8 or 9) and one bearing end (2.1 or 3.1) of a link plate (2 or 3) is pre-assembled into a provisional unit by way of a fastening means arranged on the bearing housing parts and at the bearing ends, and that the provisional units are positioned in alignment with one another, and are then definitively fixed to one another.

13. The method according to claim 10, wherein the bearing ends (2.1 and 3.1) of the link plates (2 and 3), and the part flanges (17) of the bearing housing parts (8 and 9) are fixed to each other with the help of rivets (20) arranged in aligned bores (22).

* * * * *

UNITED STATES PATENT AND TRADEMARK OFFICE
CERTIFICATE OF CORRECTION

PATENT NO. : 7,334,677 B2  Page 1 of 1
APPLICATION NO. : 11/682491
DATED : February 26, 2008
INVENTOR(S) : Mader It is certified that error appears in the above-identified patent and that said Letters Patent is hereby corrected as shown below:

In Column 6, Line 41 (Claim 6, Line 7), delete "GE".

Signed and Sealed this

Twenty-sixth Day of August, 2008

JON W. DUDAS
*Director of the United States Patent and Trademark Office*